July 5, 1960

D. L. CHUBB 2,943,604

MOTOR VELOCITY CONTROL VALVE

Filed May 17, 1956

INVENTOR
DALE L. CHUBB

BY *Michael Hertz*
ATTORNEY

United States Patent Office 2,943,604
Patented July 5, 1960

2,943,604
MOTOR VELOCITY CONTROL VALVE

Dale L. Chubb, Williamsport, Pa., assignor, by mesne assignments, to Sylvania Electric Products Inc., Wilmington, Del., a corporation of Delaware Filed May 17, 1956, Ser. No. 585,413

4 Claims. (Cl. 121—38)

This invention relates to control valves.

It is an object of this invention to provide a valve which shall control the flow of fluid pressure into and out of a motor to provide substantially constant regulatable velocity of movement of the translatable portion of the motor throughout its stroke.

Another object of the invention is to make the control in the form of a piston valve with the velocity control incorporated and movable with the piston valve.

Another object of the invention is to provide means whereby the stroke of a double acting motor may be velocity regulated in each direction of movement of the motor.

Still another object of the invention is to provide a simple construction which shall fulfill the above objects, so that it is cheap to manufacture, easy to adjust, and dependable in operation.

Figure 2:
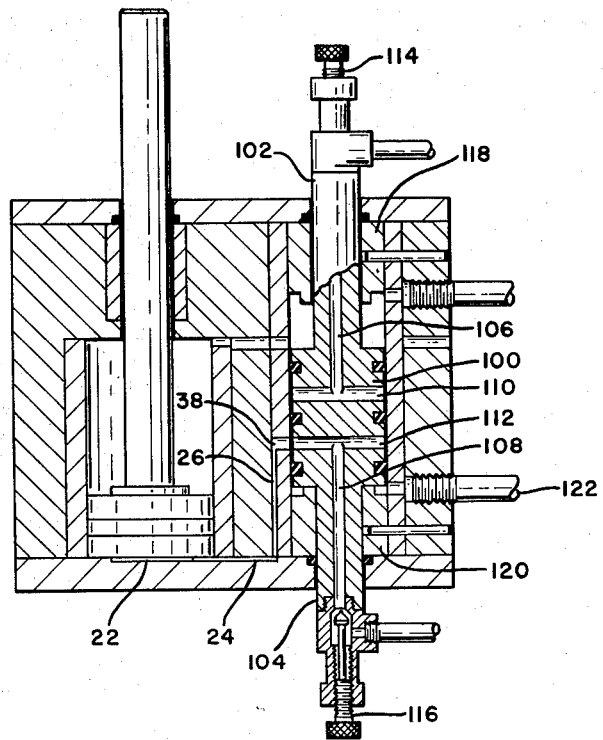
Figure 1:
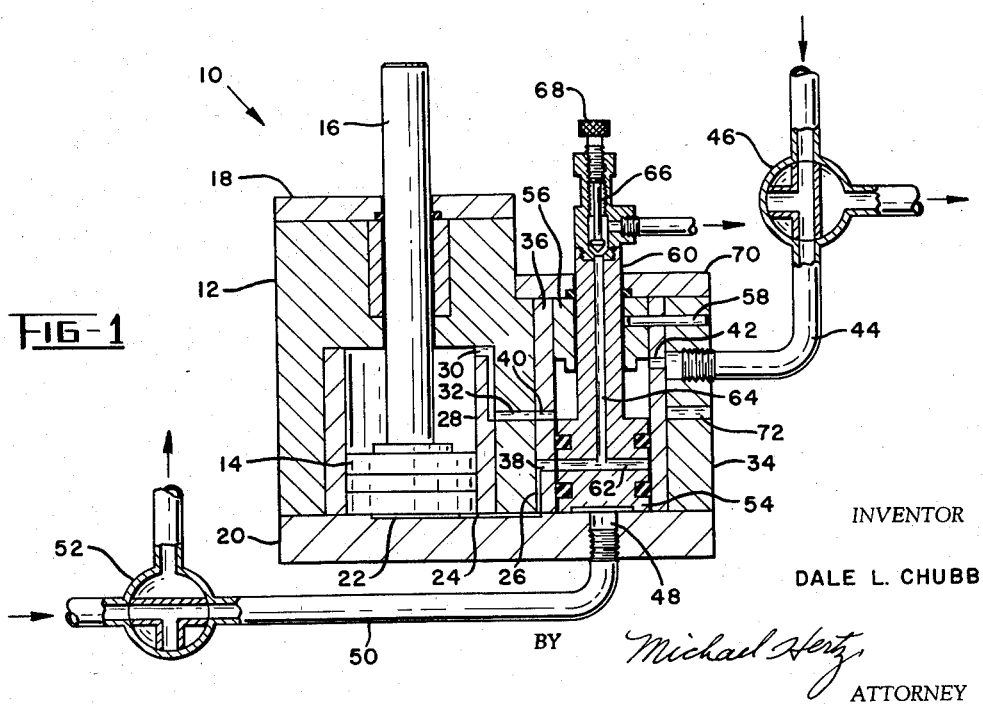

Other objects will become apparent after consideration of the following specification when taken in conjunction with the accompanying drawings in which:

Fig. 1 is a cross-section through a double acting motor and a piston control valve to secure controlled velocity of motor piston movement in both directions of its movement, and Fig. 2 is a similar section through a double acting motor with independent velocity controls for both movements of the motor piston.

Referring to the drawings in greater detail, in Fig. 1 there is shown a motor 10, here shown as of the piston and cylinder motor type, though obviously other types, such as oscillating valve or bellows, may be employed, as will become apparent. The motor is here shown as comprising a cylinder 12 and piston 14 with its piston rod 16, with suitable packing for the piston rod, and cover plates 18 and 20 for the cylinder. The lower cover plate is centrally counterbored as at 22 and is provided with a port 24 leading to a passageway 26 communicating with a valve. For convenience in manufacture, the bore of the cylinder is lined with a fixed sleeve 28, cut away at its upper edge and recessed on its outer surface to provide a conduit 30 leading to a second passageway 32 located above the passageway 26.

The control valve comprises a cylinder 34 preferably made integral with the cylinder 12. Within the cylinder is a fixed sleeve 36 having ports 38 and 40 communicating with passageways 26 and 32 and a port 42 communicating with a combined inlet and exhaust 44 and which may be controlled by a three-way valve 46. A second combined inlet and exhaust port 48 is provided in the bottom of the cylinder which port may also be connected to a three-way valve 52 preferably ganged for operation with the valve 46, although for convenience of disclosure, not so shown.

Within the sleeve 36 is a piston valve 54 limited in its upward movement by a combined stop and bushing 56 held against motion relative to the sleeve and casing by a pin 58 or the like. The piston valve has a piston rod 60 extending through the bushing and to the exterior of the cylinder. Extending through the piston valve is a bore 62 registering with the port 38 at one limit of its motion and with the port 40 at its other limit. The piston rod has a central bore 64 communicating with the bore 62, the outer end of the bore being controlled by an adjustable throttling valve here shown as a needle valve 66 provided with the knurled adjusting knob 68. A suitable cover plate 70 closes the upper end of the cylinder 34. The opening 72 is provided to permit the passage of a boring tool during the boring of passageway 32.

Upon admission of fluid pressure via conduit 50 to the underside of the piston valve 54 and opening of conduit 44 to exhaust, the piston valve will quickly move to its upper position. Thereupon the underside of piston valve 54 will uncover port 38 allowing fluid pressure to enter the space beneath motor piston 14. With the piston valve in its up position, the bore 62 communicates with port 40. Therefore, as pressure is applied to the motor piston on its underside, the fluid above the motor piston escapes through opening 30, channel 32, port 40, bores 62 and 64, past the needle valve 66 and to the atmosphere or to a flexible conduit connected to the fluid escape opening from the needle valve. The speed of the motor piston 14, it should be obvious, can be closely controlled by the needle valve, and the arrangement described is simple since the needle valve is part of the valve piston rod. Reversal of fluid through the conduits 44 and 50 brings the piston valve to the position shown in Fig. 1 whereupon the upper port 40 is uncovered to the inlet of fluid while the exhaust of fluid from beneath the motor piston is restricted by the needle valve.

However, the above arrangement permits only like control for both directions of movement of the motor piston.

To obtain variable control of motion of the motor piston in both directions thereof, the arrangement of Fig. 2 may be adopted. In this figure, the piston valve 100 has two piston rods 102 and 104, each provided with a longitudinal bore 106 and 108, communicating with cross bores 110 and 112, respectively. Each of the bores 106 and 108 is controlled by its own needle valve 114 and 116. Also the combined stop and bushing 118, 120 is provided at each end of the valve cylinder. The flow of fluid to and from beneath the piston valve takes place through side port 122 instead of through the bottom of the valve casing as in Fig. 1 and the exhaust of fluid from beneath the motor piston is via passageways 22, 24, 26 and 38 through the bores 112 and 108 and the needle valve 116 which may be adjusted to give a different speed of movement of the motor piston than does needle valve 114.

Having thus described the invention, what is claimed as new is:

1. A valve for controlling a double acting motor comprising a valve casing having two spaced ports for communication with opposite ends of the motor, a third port near one end of the casing and a fourth port adjacent the opposite end of the casing, a piston valve reciprocatable in said casing and having a valve piston rod extending to the exterior of the casing, a bore within the piston valve in position to engage one or the other of the first two ports in shifted positions, said bore extending along the length of and through the valve piston rod to the exterior thereof, and a needle valve on the valve piston rod at the end of the bore to control the exhaust of fluid through said bore, one of the third and fourth ports communicating alternatively with that one of the first two ports which is out of communication with the bore in the piston valve and the other of the third and fourth ports communicating with a space in the valve casing of which the piston valve forms a movable wall.

2. A valve for controlling a double acting motor comprising a valve casing having two spaced ports for communication with opposite ends of the motor, a third port near one end of the casing and a fourth port adjacent the opposite end of the casing, a valve reciprocatable in said casing and having a piston valve rod extending beyond both ends of the casing and an intermediate piston with two horizontal bores, said valve being movable to uncover, alternatively one or the other of the first two ports, one of the horizontal bores in one position of the valve communicating with one of the first two ports, and the other of the horizontal bores, in another position of the valve, uncovering the second of the first two ports, each horizontal bore communicating with a bore extending, respectively, along its adjacent valve piston rod portion to the exterior of the casing, and a needle valve at the end of each valve piston rod portion controlling the flow of fluid through the bores, the third and fourth ports communicating alternatively with that port of the first two ports which is not in communication with a horizontal bore in the piston valve and with a space in the valve casing of which the piston valve forms a movable wall.

3. A valve for controlling a double-acting motor comprising a valve casing having two spaced ports communicating with opposite ends of the motor, a third port near one end of the casing and a fourth port adjacent the opposite end of the casing, a valve reciprocatable in said casing and having a valve piston rod extending beyond an end of the casing and a piston valve with a bore therein, said piston valve being movable to uncover one or the other of the first two ports, the bore in the piston valve communicating with one of the first two ports in one position on the valve and with the other of the first two ports in another position thereof, said bore in the piston valve communicating with a bore extending along the valve piston rod, and a needle valve at the end of the valve piston rod controlling the flow of fluid through the bores.

4. A control valve for a motor comprising a valve casing having ports therethrough for communication with opposite sides of a double acting motor piston, a first elongated valve reciprocatable in the direction of its elongation in said casing and having a portion extending exteriorly of the casing, said first valve having a cross bore communicating alternatively with said ports and a second bore communicating with the first bore and running longitudinally of the said first valve and terminating via the said portion exteriorly of the casing, an adjusted throttling valve at the terminal of the second bore, said first valve being in the form of a piston and positioned within a cylinder, and means for controlling the flow of fluid pressure to both ends of the cylinder.

References Cited in the file of this patent

UNITED STATES PATENTS

| | | |
|---|---|---|
| 719,109 | Hanson | Jan. 27, 1903 |
| 1,824,058 | Scott | Sept. 22, 1931 |
| 2,416,933 | Lynam | Mar. 4, 1947 |
| 2,568,450 | Hjarpe | Sept. 18, 1951 |
| 2,757,642 | Raney | Aug. 7, 1956 |

FOREIGN PATENTS

| | | |
|---|---|---|
| 644,689 | Germany | June 14, 1937 |